(12) United States Patent
Nakamura et al.

(10) Patent No.: US 7,957,071 B2
(45) Date of Patent: Jun. 7, 2011

(54) FOCUS ADJUSTMENT METHOD OF ZOOM LENS SYSTEM

(75) Inventors: Toshiki Nakamura, Saitama (JP); Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 57 days.

(21) Appl. No.: 12/430,355

(22) Filed: Apr. 27, 2009

(65) Prior Publication Data

US 2009/0273849 A1 Nov. 5, 2009

(30) Foreign Application Priority Data

Apr. 30, 2008 (JP) ................................. 2008-118428

(51) Int. Cl.
*G02B 15/14* (2006.01)
(52) U.S. Cl. .................... 359/689; 359/676; 359/696
(58) Field of Classification Search .......... 359/676–690, 359/695–698
See application file for complete search history.

(56) References Cited

U.S. PATENT DOCUMENTS

| | | | | |
|---|---|---|---|---|
| 4,465,343 | A * | 8/1984 | Horimoto | 359/680 |
| 6,122,112 | A | 9/2000 | Oono et al. | |
| 6,349,002 | B1 * | 2/2002 | Shibayama et al. | 359/689 |
| 6,397,009 | B1 | 5/2002 | Ito et al. | |
| 6,943,961 | B2 | 9/2005 | Eguchi | |
| 2005/0254143 | A1 | 11/2005 | Saito et al. | |
| 2008/0158690 | A1 | 7/2008 | Eguchi | |
| 2009/0034090 | A1 | 2/2009 | Eguchi | |
| 2009/0034092 | A1 | 2/2009 | Eguchi | |

FOREIGN PATENT DOCUMENTS

| | | |
|---|---|---|
| JP | 11-30740 | 2/1999 |
| JP | 2000-275502 | 10/2000 |
| JP | 2000-275503 | 10/2000 |
| JP | 2000-275504 | 10/2000 |
| JP | 2000-352649 | 12/2000 |
| JP | 2004-294976 | 10/2004 |

OTHER PUBLICATIONS

English language Abstract and translation of JP 11-30740, Feb. 2, 1999.
English language Abstract and translation of JP 2000-275502, Oct. 6, 2000.
English language Abstract and translation of JP 2000-275503, Oct. 6, 2000.
English language Abstract and translation of JP 2000-275504, Oct. 6, 2000.
English language Abstract and translation of JP 2000-352649, Dec. 19, 2000.
English language Abstract and translation of JP 2004-294976, Oct. 21, 2004.

* cited by examiner

*Primary Examiner* — Darryl J Collins
(74) *Attorney, Agent, or Firm* — Greenblum & Bernstein P.L.C.

(57) ABSTRACT

A focus adjustment method of a zoom lens system is provided for correcting a focal point shift caused by manufacturing error. The zoom lens system includes three movable lens groups in which at least two of said lens groups are moved to perform zooming to form an image onto an imaging device. In the zoom lens system, a finite number of focal length positions at which a focus adjustment is performed is provided. The lens group closest to the imaging device out of the three lens groups includes a focusing lens group. A position of the focusing lens group is controlled via pulses of a stepping motor. The focus adjustment method includes the combination of performing the above control of the focusing lens group to determine a position of the focusing lens group via pulses of the stepping motor and determining an amount of adjustment of the imaging device.

6 Claims, 3 Drawing Sheets

FOCUS ADJUSTMENT METHOD OF ZOOM LENS SYSTEM

BACKGROUND OF THE INVENTION

1. Field of the Invention

The present invention relates to an adjustment method during assembly (manufacture) of a zoom lens system.

2. Description of Related Art

In a zoom lens system, since a state, in which an object image incident on an imaging device is generally out-of-focus (due to focal point shift) when the lens groups are positioned at their standard positions (predetermined at the design stage), occurs due to manufacturing errors such as machining error and/or assembly error, the amount of focal point shift from the short focal length extremity to the long focal length extremity can be optically reduced to a negligible level by carrying out a focus adjustment (zoom adjustment). In a typical focus adjustment method of a zoom lens system, it is necessary for the imaging plane to remain stationary during zooming, and to align this imaging plane with the image-forming plane of the imaging device; and therefore, these adjustments are conventionally carried out by changing the relative positions of at least two lens groups.

For example, in Japanese Unexamined Patent Publication No. H11-30740, a device which adjusts a focal point-shift (caused by machining error and/or assembly error) is disclosed, in which the amount of focal point shift is detected at various focal lengths by moving a lens group which mainly contributes to focus adjustment, the amount of adjustment at each focal length is obtained (via calculation), and correction data is written into a zoom-data table for controlling the positions of each lens group so that it is possible to carry out a focus adjustment by moving the lens groups based on this zoom-data during a photographing operation.

As a mechanical zoom adjustment method, e.g., disclosed in Japanese Unexamined Patent Publication No. 2000-352649, a focal point shift at an intermediate focal length is minimized by changing the standard positions of at least three lens groups during an adjustment at the assembly stage.

In recent years, further miniaturization of digital compact cameras due to further miniaturization of electronic components has progressed, and further miniaturization of the photographing optical system (zoom lens system) is also in demand. From the viewpoint of further miniaturization found in the related art, it is understood that the adjustment method of the related art requires a mechanism for moving each lens group (which mainly contributes to zooming) along the optical axis. However, the structure of such a mechanism is complicated, and the optical design thereof which requires a surplus adjustment has to be further considered among the lens groups. Such an optical design hinders further miniaturization of the zoom lens system.

SUMMARY OF THE INVENTION

The present invention provides a focus adjustment method of a zoom lens system which can easily carry out a focus adjustment without enlarging the zoom lens system.

According to an aspect of the present invention, a focus adjustment method of a zoom lens system is provided for correcting a focal point shift caused by manufacturing error.

The zoom lens system includes three movable lens groups in which at least two of the movable lens groups are moved in an optical axis direction to perform zooming to form an image onto an imaging device.

In the zoom lens system, a finite number of focal length positions at which a focus adjustment is performed is provided.

The lens group which is closest to the imaging device out of the three movable lens groups includes a focusing lens group.

A position of the focusing lens group in the optical axis direction is controlled via pulses of a stepping motor. The focus adjustment method of a zoom lens system includes the combination of performing the above control of the focusing lens group to determine a position of the focusing lens group in the optical axis direction via pulses of the stepping motor and determining an amount of adjustment of the imaging device in the optical axis direction.

The above performing the control of the focusing lens group and the above determining an amount of adjustment of the imaging device preferably include:

a first adjustment in which an amount of adjustment of the imaging device in the optical axis direction is determined based on a traveling distance of the focusing lens group from a standard position to an in-focus position thereof, respectively at the long focal length extremity and the short focal length extremity; and a second adjustment in which the focusing lens group is moved, at least three distinct focal length positions including the short focal length extremity and the long focal length extremity, to an in-focus position with respect to the imaging device having been adjusted via the first adjustment; at each of the focal length positions, an amount of focus adjustment of the focusing lens group is determined; and the amount of focus adjustment is stored in a memory as a pulse number of the stepping motor.

The focus adjustment method of a zoom lens system preferably satisfies the following conditions:

$$|\Delta FB(W)| \leq |\Delta X2| \leq |\Delta FB(T)|$$

$$|\Delta X2|/fw \leq 0.1$$

wherein $\Delta FB(W)$ designates the amount of focal point shift at the short focal length extremity;

$\Delta FB(T)$ designates the amount of focal point shift at the long focal length extremity;

$\Delta X2$ designates an amount of adjustment of the imaging device in the optical axis direction; and fw designates the focal length of the entire zoom lens system at the short focal length extremity.

The amount of adjustment of the imaging device is preferably determined so that the amount of focus adjustment of the focusing lens group at the short focal length extremity has an opposite sign to that of the amount of focus adjustment of the focusing lens group at the long focal length extremity.

The focus adjustment method of a zoom lens system preferably satisfies the following condition:

$$|\Delta X1(W)+\Delta X1(T)|/fw<0.15$$

wherein $\Delta X1(W)$ designates an amount of focus adjustment of the focusing lens group at the short focal length extremity;

$\Delta X1(T)$ designates an amount of focus adjustment of the focusing lens group at the long focal length extremity; and fw designates the focal length of the entire zoom lens system at the short focal length extremity.

The three movable lens groups includes a first lens group having a negative refractive power (hereinafter, a negative first lens group), a second lens group having a positive refractive power (hereinafter, a positive second lens group), a third lens group, as a focusing lens group, having a positive refractive power (hereinafter, a positive third lens group), and an imaging device with a filter group, in this order from the object.

According to an aspect of the present invention, there is provided an electronic imaging apparatus including a zoom lens system which is adjusted according to the focus adjustment method of a zoom lens system of the present invention.

The present disclosure relates to subject matter contained in Japanese Patent Application No. 2008-118428 (filed on Apr. 30, 2008) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1A:
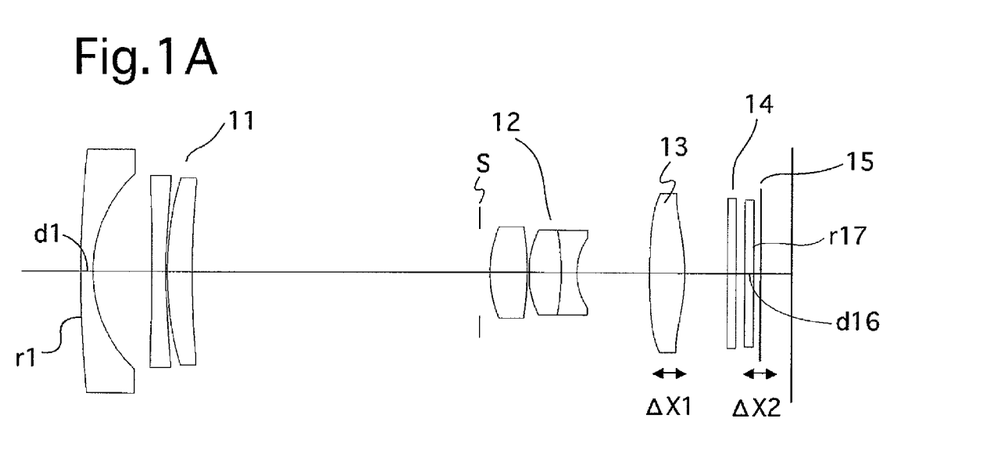
FIG. 1A shows a lens arrangement of a zoom lens system, having three lens groups, to which the focus adjustment method of the present invention is applied.

FIG. 1A shows the lens arrangement of the zoom lens system, having three lens groups, to which the focus adjustment method of the present invention.

Figure 1B:
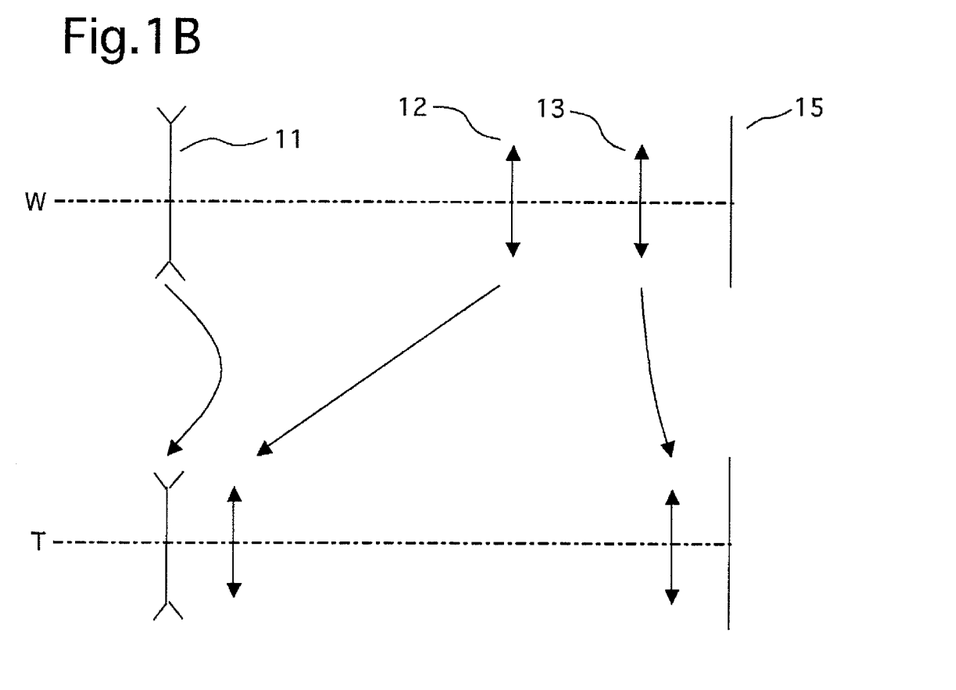
FIG. 1B shows a schematic lens-group moving paths of the zoom lens system shown in FIG. 1A.

FIG. 1B shows a schematic lens-group moving paths of the zoom lens system shown in FIG. 1A.

The zoom lens system includes a negative first lens group 11, a diaphragm S, a positive second lens group 12, the positive third lens group 13, and the imaging device 15 with the filter group 14, in this order from the object.

Upon zooming from the short focal length extremity (W) to the long focal length extremity (T), the negative first lens group 11, the positive second lens group 12 and the positive third lens group 13 are moved along the optical axis, thereby forming an image on the imaging device 15.

More specifically, upon zooming from the short focal length extremity (W) to the long focal length extremity (T), the distance between the negative first lens group 11 and the positive second lens group 12 decreases; the distance between the negative second lens group 12 and the positive third lens group increases.

The diaphragm S is provided between the negative first lens group 11 and the positive second lens group 12, and moves together with the positive second lens group 12.

The positions of the negative first lens group 11 and the positive second lens group 12 are changed in the optical axis direction via a cam mechanism, and the position of the third lens group 13 is changed in the optical axis direction via a stepping motor.

The positive third lens group 13 is a focusing lens group, and the positional control thereof in the optical axis direction, i.e., the initial position (focus adjustment position), a zoom position and a focus position, is carried out via pulses of the stepping motor.

A change in position of the imaging device 15 is mechanically carried out by a mechanical adjustment mechanism and spacers (not shown).

Figure 2:
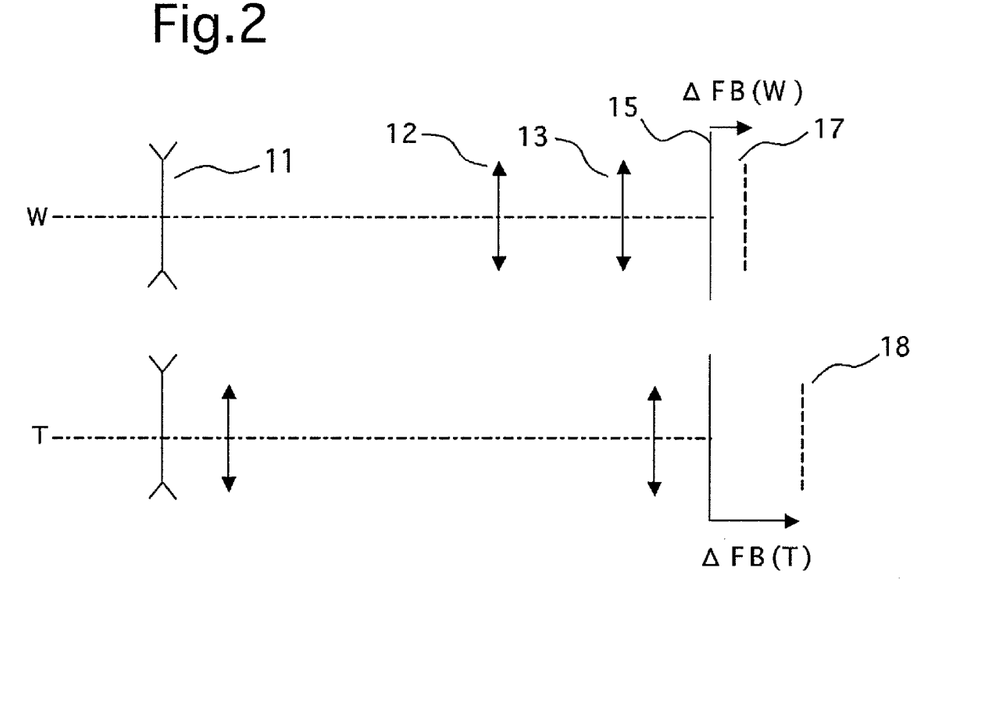
FIG. 2 shows a state in which a focal point shift ($\Delta FB(W)$, $\Delta FB(T)$) from the imaging device 15 has occurred in the zoom lens system shown in FIG. 1A at the short focal length extremity (W) and long focal length extremity (T) due to manufacturing error when the negative first lens group 11, the positive second lens group 12 and the positive third lens group 13 are positioned at their standard positions.

FIG. 2 shows a state in which a focal point shift ($\Delta FB(W)$, $\Delta FB(T)$) from the imaging device 15 has occurred in the zoom lens system shown in FIG. 1A at the short focal length extremity (W) and long focal length extremity (T) due to manufacturing error when the negative first lens group 11, the positive second lens group 12 and the positive third lens group 13 are positioned at their standard positions.

According to FIG. 2, the in-focus position with a focal point shift $\Delta FB(W)$ due to manufacturing error at the short focal length extremity (W) (actual imaging positions with respect to an object at a predetermined distance) is designated as 17; and the in-focus position with a focal point shift $\Delta FB(T)$ due to manufacturing error at the long focal length extremity (T) (actual imaging positions with respect to an object at a predetermined distance) is designated as 18.

Figure 4:
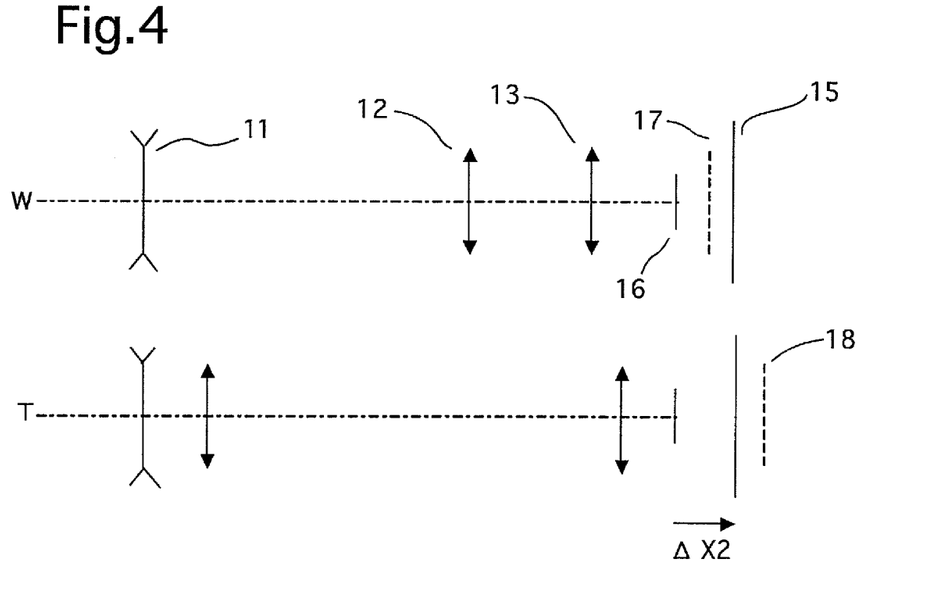
FIG. 4 shows a process of determining the amount of adjustment ($\Delta X2$) of the imaging device in the optical axis direction based on a traveling distance of the focusing lens group from a standard position to an in-focus position thereof, respectively at the short focal length extremity (W) and the long focal length extremity (T), and moving the imaging device by the amount of adjustment ($\Delta X2$) in the optical axis direction (the first adjustment)
Figure 5:
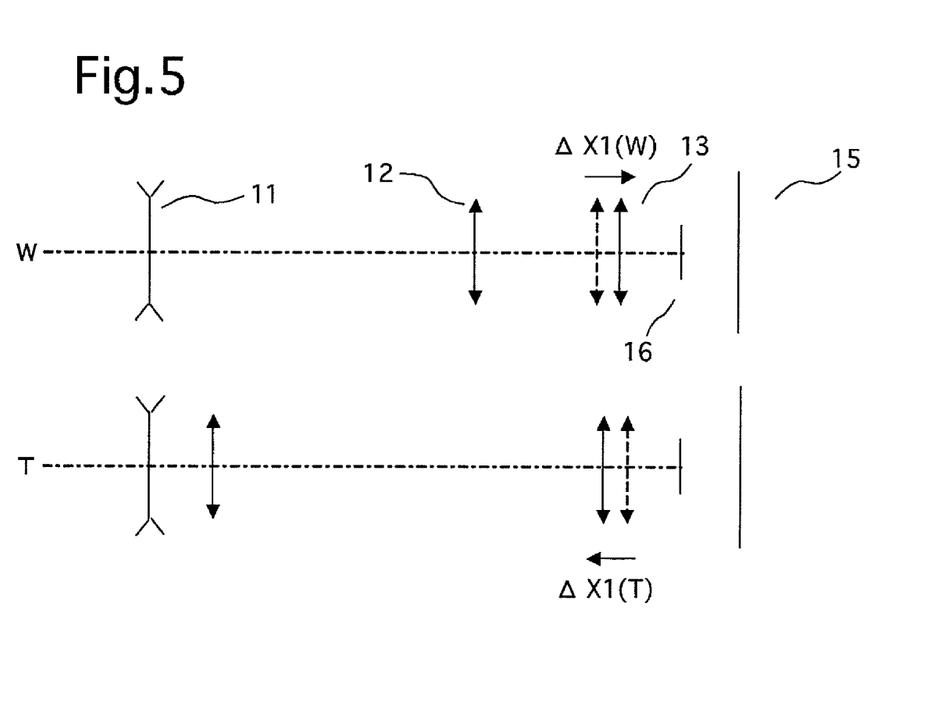
FIG. 5 shows a process of moving the focusing lens group, at least three distinct focal length positions including the short focal length extremity (W) and the long focal length extremity (T), to an in-focus position with respect to the imaging device having been adjusted via the first adjustment, and determining the amount of focus adjustment ($\Delta X1(W)$, $\Delta X1(T)$) of the focusing lens group at each of the focal length positions (the second adjustment).

The amount of focal point shift is defined as negative when the focal point shift occurs in front of the imaging plane 16, while the amount of focal point shift is defined as positive when the focal point shift occurs behind the imaging plane 16 (refer to FIG. 4 and FIG. 5). In the case of FIG. 2, the imaging plane 16 coincides with the imaging device 15, and the amount of focal point shift (($\Delta FB(W)$, $\Delta FB(T)$)) is positive.

Figure 3:
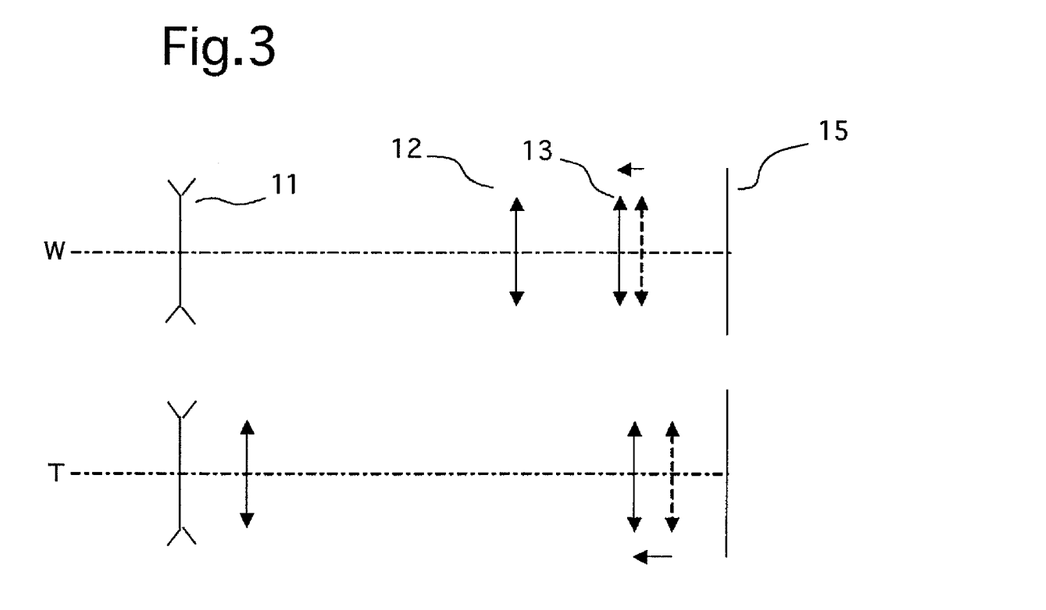
FIG. 3 shows a process of determining the amount of focal point shift ($\Delta FB(W)$, $\Delta FB(T)$) of the focusing lens group according to a traveling distance of the focusing lens group from the standard position to the in-focus position.

In FIG. 3, the amount of focal point shift ($\Delta FB(W)$) from the imaging device 15 respectively at the short focal length extremity (W) and the amount of focal point shift ($\Delta FB(T)$) at the long focal length extremity (T) are determined based on a traveling distance of the positive third lens group 13 (number of pulses of the stepping motor) from the respective standard positions at the short focal length extremity (W) and the long focal length extremity (T) when an adjustment is carried out to move the positive third lens group 13 in the optical axis direction to the in-focus position which coincides with the imaging device 15.

The focal point shifts $\Delta FB(W)$ and $\Delta FB(T)$ are detected (measured), and the traveling distance of the imaging device 15 is determined based on these detected focal point shifts. Subsequently, as shown in FIG. 4, the imaging device 15 is moved by the above traveling distance to a desired position.

This movement constitutes the first adjustment which determines the traveling distance of the imaging device 15 in the optical axis direction.

In other words, an amount of adjustment ($\Delta X2$) of the imaging device 15 in the optical axis direction is determined based on a traveling distance of the focusing lens group 13 from a standard position to an in-focus position thereof, respectively at the short focal length extremity (W) and the long focal length extremity (T), and the imaging device 15 is moved by the amount of adjustment in the optical axis direction.

Upon completion of the first adjustment in FIG. 4, the second adjustment is carried out, as shown in FIG. 5, in which at least three distinct focal length positions including the short focal length extremity (W) and the long focal length extremity (T), the positive third lens group (focusing lens group) 13 is moved from the standard position to the in-focus position to determine the amount of focus adjustment ($\Delta X1$ (W), $\Delta X1$ (T)) at each of these focal lengths, and the amount of focus adjustment is stored in a memory (not shown), i.e., the number of pulses of the stepping motor corresponding thereto is stored in the memory.

As explained, a focus adjustment is carried out in the optical axis direction by the above-described positional adjustment (first adjustment) of the imaging device 15 and the above-described positional adjustment (second adjustment) of the positive third lens group (focusing lens group) 13 which is the closest lens group to the imaging plane, and is controlled via pulses of the stepping motor.

Accordingly, the mechanism of the lens groups which mainly contribute to zooming (i.e., the negative first lens group 11 and the positive second lens group 12) can be simplified. Namely, a mechanism for moving the negative first lens group 11 and the positive second lens group 12 for carrying out a focus adjustment is not required. Therefore a distance between lens groups can be reduced, so that the zoom lens system can further be miniaturized.

The amount of adjustment ($\Delta X2$) of the imaging device 15 in the optical axis direction according to the first adjustment preferably satisfies conditions (1) and (2) when fw designates the focal length of the entire zoom lens system at the short focal length extremity:

$$|\Delta FB(W)| \leq |\Delta X2| \leq |\Delta FB(T)| \quad (1)$$

$$|\Delta X2|/fw \leq 0.1 \quad (2)$$

wherein
$\Delta FB(W)$ designates the amount of focal point shift at the short focal length extremity;
$\Delta FB(T)$ designates the amount of focal point shift at the long focal length extremity.

Generally, the absolute value of the focal point shift caused by manufacturing error is substantially proportional to the focal length. In other words, the relationship $|\Delta FB(W)| < |\Delta FB(T)|$ is established.

If an attempt is made to adjust the imaging device 15 to the extent that the amounts of adjustment ($\Delta X2$) satisfies $|\Delta FB(W)| \leq |\Delta X2| \leq |\Delta FB(T)|$, the amounts of focus adjustment $\Delta X1i$ (i=1, ... , n (at least three distinct focal length positions)) (second adjustment) of the positive third lens group 13 (the focusing lens group) at each focal length between the short focal length extremity (W) and the long focal length extremity (T) can be made smaller The values of $\Delta X2$ can each be determined in accordance with the optical quality of the zoom lens system and the amount of leeway given to the amount of focus adjustment.

Focusing sensitivity of the positive third lens group (focusing lens group) 13 which carries out the second adjustment has the same sign from the short focal length extremity (W) to the long focal length extremity (T).

Then, in the first adjustment (refer to FIG. 4), if an attempt is made to position the imaging device 15 between the focal point shift 17 and the focal shift 18, the amount of focus adjustment ($\Delta X1(W)$, $\Delta X1(T)$) of the focusing lens group 13 at the short focal length extremity (W) and the long focal length extremity (T) can have differing signs (+ and –, or vice versa). As a result, it is possible to reduce the amount of focus adjustment at each focal length.

If $|\Delta X2|/fw$ exceeds the upper limit of condition (2), it becomes necessary to provide a large amount of leeway for mechanically adjusting the position of the imaging device 15, which undesirably increases the size of the zoom lens system.

In the second adjustment in which at least three distinct focal length positions including the short focal length extremity (W) and the long focal length extremity (T), the positive third lens group (focusing lens group) 13 is moved from the standard position to the in-focus position to determine the amount of focus adjustment ($\Delta X1(W)$, $\Delta X1(T)$) at each of these focal lengths, it is preferable that the amount of focus adjustment be smaller from the viewpoint of the optical specifications and imaging quality, and that condition (3) be preferably satisfied.

If $|\Delta X1(W)+\Delta X1(T)|/fw$ exceeds the lower limit or the upper limit of condition (3), the amount of focus adjustment $\Delta X1(T)$ at the long focal length extremity (T) or the amount of focus adjustment $\Delta X1(W)$ at the short focal length extremity (W) increases. Consequently, it becomes impossible to miniaturize the zoom lens system; change in the focal length due to the focus adjustment becomes larger; and off-axis aberrations deteriorate. Therefore the zoom lens system cannot attain desired optical specifications.

Specific numerical embodiments will be herein discussed.

In the tables, F$_{NO}$ designates the f-number, f designates the focal length of the entire zoom lens system, A designates the half angle-of-view (°), fB designates the back focal distance (the distance from the image-side surface of the most image-side cover glass to the image plane), r designates the radius of curvature, d designates the lens-element thickness or distance between lens elements, Nd designates the refractive index of the d-line, and vd designates the Abbe number.

The values for the distance "d" which are variable according to F$_{NO}$, f, W, fB and zooming are indicated in the order of the short focal length extremity (W), an intermediate focal length (M) and the long focal length extremity (T).

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Table 1 shows the numerical data of the zoom lens system (having three lens groups) of a first embodiment, according to the focus adjustment method of the present invention.

Table 2 shows zoom data of each lens group when an object at infinity is photographed; and data of the amount of focus adjustment.

The diaphragm S is provided 0.60 in front (on the object side) of the second lens group 20 (surface No. 7).

The amount of focal point shift and the amount of focus adjustment (negative (–): the focal point shift occurs in front of the imaging plane 16; positive (+): the focal point shift occurs behind the imaging plane 16) are set in accordance with the pulse number of the stepping motor.

Furthermore, K3(W), K3(M) and K3(T) designate focusing sensitivity of the positive third lens group (focusing lens group) 13 at the short focal length extremity (W), an intermediate focal length (M) and the long focal length extremity (T).

TABLE 1

FNO. = 1:2.6-3.7-6.1
f = 5.00(W)-9.80(M)-20.04(T)
A = 41.4-22.6-11.5
fB = 0.59-0.59-0.59

| Surf. No. | r | d | Nd | ν |
|---|---|---|---|---|
| 1 | 62.312 | 0.70 | 1.77250 | 49.6 |
| 2 | 7.598 | 3.38 | | |
| 3* | 73.041 | 0.80 | 1.54358 | 55.7 |
| 4* | 20.704 | 0.10 | | |
| 5 | 18.876 | 1.40 | 1.92286 | 18.9 |
| 6 | 50.960 | 17.02-7.06-1.83 | | |
| 7* | 6.688 | 2.10 | 1.49700 | 81.6 |
| 8* | −15.776 | 0.10 | | |
| 9 | 5.620 | 1.80 | 1.75700 | 47.8 |
| 10 | −14.180 | 0.90 | 1.80610 | 33.3 |
| 11 | 3.484 | 4.17-9.83-20.87 | | |
| 12* | 33.208 | 2.00 | 1.54358 | 55.7 |
| 13* | −11.311 | 2.43-2.09-1.20 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.00 | −0.12295 × 10$^{-2}$ | 0.48935 × 10$^{-4}$ | −0.60367 × 10$^{-6}$ |
| 4 | −1.00 | −0.13418 × 10$^{-2}$ | 0.52036 × 10$^{-4}$ | −0.76764 × 10$^{-6}$ |
| 7 | −1.00 | 0.13222 × 10$^{-4}$ | 0.13088 × 10$^{-4}$ | −0.12846 × 10$^{-5}$ |
| 8 | −1.00 | 0.12167 × 10$^{-3}$ | 0.14282 × 10$^{-4}$ | −0.15874 × 10$^{-5}$ |
| 12 | −1.00 | −0.84756 × 10$^{-4}$ | 0.48311 × 10$^{-4}$ | −0.44751 × 10$^{-6}$ |
| 13 | −1.00 | 0.24053 × 10$^{-3}$ | 0.34834 × 10$^{-4}$ | 0.80658 × 10$^{-6}$ |

| Surf. No. | A10 |
|---|---|
| 4 | 0.92200 × 10$^{-9}$ |
| 13 | −0.32142 × 10$^{-7}$ |

The symbol * designates the aspherical surface which is rotationally symmetrical with respect to the optical axis.

TABLE 2

Data of Each Lens Group
(when an object at infinity is photographed)

| Lens-Group No. | Magnification of Each Lens Group | | |
|---|---|---|---|
| | W | M | T |
| 1 | 0.000 | 0.000 | 0.000 |
| 2 | −0.514 | −0.979 | −1.858 |
| 3 | 0.713 | 0.735 | 0.791 |

Focusing sensitivity of each lens group

| Lens-Group No. | K3 (W) | K3 (M) | K3 (T) |
|---|---|---|---|
| 1 | 0.134 | 0.518 | 2.160 |
| 2 | 0.374 | 0.022 | −1.534 |
| 3 | 0.492 | 0.460 | 0.374 |

TABLE 2-continued

The amount of focal point shift (a shift from the designed position of the imaging plane) occurring at W, M and T due to manufacturing error:

ΔFB(W) = 0.099
ΔFB(M) = 0.193
ΔFB(T) = 0.488

The amount of adjustment of the imaging device 15 (the first adjustment):

ΔX2 = 0.30

The amount of focal point shift remaining after the first adjustment:

ΔFB(W) − ΔX2 = −0.201
ΔFB(M) − ΔX2 = −0.107
ΔFB(T) − ΔX2 = 0.188

The amount of focus adjustment by the focusing lens group at W, M and T (the second adjustment):

ΔX1(W) = −(ΔFB(W) − ΔX2)/K3(W) = 0.409
ΔX1(M) = −(ΔFB(M) − ΔX2)/K3(M) = 0.233
ΔX1(T) = −(ΔFB(T) − ΔX2)/K3(T) = −0.502

Embodiment 2

Table 3 shows the numerical data of the zoom lens system (having three lens groups) of a second embodiment, according to the focus adjustment method of the present invention.

Table 4 shows zoom data of each lens group when an object at infinity is photographed; and data of the amount of focus adjustment.

The diaphragm S is provided 0.60 in front (on the object side) of the second lens group 20 (surface No. 7).

The definition of the amount of focal point shift, the amount of focus adjustment and that of the focusing sensitivity (K3(W), K3(M) and K3(T)) are the same as those of the first embodiment.

TABLE 3

FNO. = 1:2.6-3.7-6.1
f = 5.00(W)-9.80(M)-20.00(T)
A = 42.0-22.9-11.5
fB = 0.59-0.59-0.59

| Surf. No. | r | d | Nd | ν |
|---|---|---|---|---|
| 1 | 47.746 | 0.70 | 1.83481 | 42.7 |
| 2 | 7.228 | 3.25 | | |
| 3* | 122.138 | 0.80 | 1.52538 | 56.3 |
| 4* | 17.567 | 0.10 | | |
| 5 | 20.355 | 1.40 | 1.92286 | 18.9 |
| 6 | 153.831 | 16.46-6.98-1.93 | | |
| 7* | 7.612 | 2.10 | 1.48749 | 70.2 |
| 8* | −14.548 | 0.10 | | |
| 9 | 5.034 | 1.80 | 1.75700 | 47.8 |
| 10 | −9.244 | 0.90 | 1.80610 | 33.3 |
| 11 | 3.347 | 4.43-10.28-21.75 | | |
| 12* | 23.098 | 2.00 | 1.54358 | 55.7 |
| 13* | −15.713 | 2.42-2.08-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.00 | −0.12427 × 10$^{-2}$ | 0.47297 × 10$^{-4}$ | −0.59826 × 10$^{-6}$ |
| 4 | −1.00 | −0.13841 × 10$^{-2}$ | 0.51363 × 10$^{-4}$ | −0.80877 × 10$^{-6}$ |
| 7 | −1.00 | 0.33563 × 10$^{-4}$ | 0.10440 × 10$^{-4}$ | −0.18565 × 10$^{-5}$ |

TABLE 3-continued

FNO. = 1:2.6-3.7-6.1
f = 5.00(W)-9.80(M)-20.00(T)
A = 42.0-22.9-11.5
fB = 0.59-0.59-0.59

| | | | | |
|---|---|---|---|---|
| 8 | −1.00 | $0.95556 \times 10^{-4}$ | $0.89799 \times 10^{-5}$ | $-0.21914 \times 10^{-5}$ |
| 12 | −1.00 | $-0.11761 \times 10^{-3}$ | $0.53847 \times 10^{-4}$ | $-0.19107 \times 10^{-5}$ |
| 13 | −1.00 | $0.26787 \times 10^{-3}$ | $0.20924 \times 10^{-4}$ | |

| Surf. No. | A10 |
|---|---|
| 4 | $0.12108 \times 10^{-8}$ |
| 8 | $0.39014 \times 10^{-7}$ |

The symbol * designates the aspherical surface which is rotationally symmetrical with respect to the optical axis.

TABLE 4

Data of Each Lens Group
(when an object at infinity is photographed)

| | Magnification of Each Lens Group | | |
|---|---|---|---|
| Lens-Group No. | W | M | T |
| 1 | 0.000 | 0.000 | 0.000 |
| 2 | −0.537 | −1.026 | −1.992 |
| 3 | 0.731 | 0.751 | 0.789 |

| Focusing sensitivity of each lens group | | | |
|---|---|---|---|
| Lens-Group No. | K3 (W) | K3 (M) | K3 (T) |
| 1 | 0.154 | 0.594 | 2.470 |
| 2 | 0.380 | −0.030 | −1.848 |
| 3 | 0.466 | 0.436 | 0.377 |

The amount of focal point shift (a shift from the designed position of the imaging plane) occurring at W, M and T due to manufacturing error:

$\Delta FB(W) = 0.114$
$\Delta FB(M) = 0.225$
$\Delta FB(T) = 0.565$
The amount of adjustment of the imaging device 15 (the first adjustment):

$\Delta X2 = 0.40$
The amount of focal point shift remaining after the first adjustment:

$\Delta FB(W) - \Delta X2 = -0.286$
$\Delta FB(M) - \Delta X2 = -0.175$
$\Delta FB(T) - \Delta X2 = 0.165$
The amount of focus adjustment by the focusing lens group at W, M and T (the second adjustment):

$\Delta X1(W) = -(\Delta FB(W) - \Delta X2)/K3(W) = 0.614$
$\Delta X1(M) = -(\Delta FB(M) - \Delta X2)/K3(M) = 0.401$
$\Delta X1(T) = -(\Delta FB(T) - \Delta X2)/K3(T) = -0.437$ Embodiment 3

Table 5 shows the numerical data of the zoom lens system (having three lens groups) of a third embodiment, according to the focus adjustment method of the present invention.

Table 6 shows zoom data of each lens group when an object at infinity is photographed; and data of the amount of focus adjustment.

The diaphragm S is provided 0.60 in front (on the object side) of the second lens group 20 (surface No. 7).

The definition of the amount of focal point shift, the amount of focus adjustment and that of the focusing sensitivity (K3(W), K3(M1), K3(M2), K3(M3) and K3(T)) are the same as those of the first embodiment.

TABLE 5

FNO. = 1:2.6-3.0-3.7-4.6-6.1
f = 5.0(W)-6.6(M1)-9.8(M2)-13.7(M3)-20.0(T)
A = 42.0-33.6-22.9-16.6-11.5
fB = 0.59-0.59-0.59-0.59-0.59

| Surf. No. | r | d | Nd | ν |
|---|---|---|---|---|
| 1 | 47.394 | 0.70 | 1.80400 | 46.6 |
| 2 | 7.400 | 3.38 | | |
| 3* | 223.682 | 0.80 | 1.54358 | 55.7 |
| 4* | 16.967 | 0.10 | | |
| 5 | 19.406 | 1.40 | 1.92286 | 21.3 |
| 6 | 137.807 | 17.01-11.99-7.31-4.30-2.11 | | |
| 7* | 6.990 | 2.10 | 1.48749 | 70.2 |
| 8* | −15.633 | 0.10 | | |
| 9 | 5.387 | 1.80 | 1.75700 | 47.8 |
| 10 | −9.999 | 0.90 | 1.80610 | 33.3 |
| 11 | 3.470 | 4.00-5.83-10.06-14.54-21.62 | | |
| 12* | 20.574 | 2.00 | 1.54358 | 55.7 |
| 13* | −17.565 | 2.74-2.77-2.28-2.13-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.00 | $-0.12323 \times 10^{-2}$ | $0.48364 \times 10^{-4}$ | $-0.60286 \times 10^{-6}$ |
| 4 | −1.00 | $-0.13532 \times 10^{-2}$ | $0.52526 \times 10^{-4}$ | $-0.77701 \times 10^{-6}$ |
| 7 | −1.00 | $0.46934 \times 10^{-4}$ | $0.11922 \times 10^{-4}$ | $-0.15609 \times 10^{-5}$ |
| 8 | −1.00 | $0.11327 \times 10^{-3}$ | $0.11977 \times 10^{-4}$ | $-0.19142 \times 10^{-5}$ |
| 12 | −1.00 | $-0.57587 \times 10^{-4}$ | $0.53800 \times 10^{-4}$ | $-0.16353 \times 10^{-5}$ |
| 13 | −1.00 | $0.22116 \times 10^{-3}$ | $0.29557 \times 10^{-4}$ | |

| Surf. No. | A10 |
|---|---|
| 4 | $0.56087 \times 10^{-9}$ |
| 12 | $0.34332 \times 10^{-7}$ |

The symbol * designates the aspherical surface which is rotationally symmetrical with respect to the optical axis.

TABLE 6

Data of Each Lens Group
(when an object at infinity is photographed)

| | Magnification of Each Lens Group | | | | |
|---|---|---|---|---|---|
| Lens-Group No. | W | M1 | M2 | M3 | T |
| 1 | 0.000 | 0.000 | 0.000 | 0.000 | 0.000 |
| 2 | 0.532 | −0.703 | −1.005 | −1.389 | −1.922 |
| 3 | 0.712 | 0.711 | 0.738 | 0.747 | 0.788 |

| Focusing sensitivity of each lens group | | | | | |
|---|---|---|---|---|---|
| Lens-Group No. | K3(W) | K3(M1) | K3(M2) | K3(M3) | K3(T) |
| 1 | 0.143 | 0.250 | 0.550 | 1.077 | 2.294 |
| 2 | 0.363 | 0.256 | −0.005 | −0.519 | −1.673 |
| 3 | 0.493 | 0.494 | 0.455 | 0.442 | 0.379 |

The amount of focal point shift (a shift from the designed position of the imaging plane) occurring at W, M1, M2, M3 and T due to manufacturing error:

$\Delta FB(W) = -0.120$
$\Delta FB(M1) = -0.153$
$\Delta FB(M2) = -0.240$
$\Delta FB(M3) = -0.362$
$\Delta FB(T) = -0.625$ TABLE 6-continued The amount of adjustment of the imaging device 15 (the first adjustment):

$\Delta X2 = -0.45$
The amount of focal point shift remaining after the first adjustment:

$\Delta FB(W) - \Delta X2 = 0.330$
$\Delta FB(M1) - \Delta X2 = 0.297$
$\Delta FB(M2) - \Delta X2 = 0.210$
$\Delta FB(M3) - \Delta X2 = 0.088$
$\Delta FB(T) - \Delta X2 = -0.17$
The amount of focus adjustment by the focusing lens group at W, M1, M2, M3 and T (the second adjustment):

$\Delta X1(W) = -(\Delta FB(W) - \Delta X2)/K3(W) = -0.669$
$\Delta X1(M1) = -(\Delta FB(M1) - \Delta X2)/K3(M1) = -0.601$
$\Delta X1(M2) = -(\Delta FB(M2) - \Delta X2)/K3(M2) = -0.461$
$\Delta X1(M3) = -(\Delta FB(M3) - \Delta X2)/K3(M3) = -0.199$
$\Delta X1(T) = -(\Delta FB(T) - \Delta X2)/K3(T) = 0.462$ Embodiment 4

Table 7 shows the numerical data of the zoom lens system (having three lens groups) of a fourth embodiment, according to the focus adjustment method of the present invention.

Table 8 shows zoom data of each lens group when an object at infinity is photographed; and data of the amount of focus adjustment.

The diaphragm S is provided 0.60 in front (on the object side) of the second lens group 20 (surface No. 7).

The definition of the amount of focal point shift, the amount of focus adjustment and that of the focusing sensitivity ($K3(W)$, $K3(M1)$, $K3(M2)$, $K3(M3)$ and $K3(T)$) are the same as those of the first embodiment.

TABLE 7

FNO. = 1:2.6-2.9-3.5-4.4-5.9
f = 5.1(W)-6.6(M1)-9.2(M2)-12.9(M3)-19.7(T)
A = 40.5-33.3-24.4-17.7-11.8
fB = 0.59-0.59-0.59-0.59-0.59

| Surf. No. | r | d | Nd | ν |
|---|---|---|---|---|
| 1 | 40.762 | 0.70 | 1.77250 | 49.6 |
| 2 | 6.964 | 3.00 | | |
| 3* | 58.372 | 0.80 | 1.54358 | 55.7 |
| 4* | 27.330 | 0.10 | | |
| 5 | 15.729 | 1.40 | 1.94595 | 18.0 |
| 6 | 27.891 | 17.77-12.42-8.37-5.23-2.36 | | |
| 7* | 6.173 | 1.98 | 1.58989 | 66.8 |
| 8* | −19.384 | 0.10 | | |
| 9 | 7.016 | 1.72 | 1.77250 | 49.6 |
| 10 | −12.396 | 1.00 | 1.80610 | 33.3 |
| 11 | 3.537 | 3.73-4.78-8.09-12.33-19.15 | | |
| 12* | 32.790 | 2.00 | 1.54358 | 55.7 |
| 13* | −13.104 | 2.52-2.90-2.40-1.87-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.00 | $-0.12253 \times 10^{-2}$ | $0.49370 \times 10^{-4}$ | $-0.65575 \times 10^{-6}$ |
| 4 | −1.00 | $-0.13716 \times 10^{-2}$ | $0.51331 \times 10^{-4}$ | $-0.79703 \times 10^{-6}$ |
| 7 | −1.00 | $0.13698 \times 10^{-5}$ | $0.96980 \times 10^{-5}$ | $-0.83521 \times 10^{-6}$ |

TABLE 7-continued

FNO. = 1:2.6-2.9-3.5-4.4-5.9
f = 5.1(W)-6.6(M1)-9.2(M2)-12.9(M3)-19.7(T)
A = 40.5-33.3-24.4-17.7-11.8
fB = 0.59-0.59-0.59-0.59-0.59

| | | | | |
|---|---|---|---|---|
| 8 | −1.00 | $0.14378 \times 10^{-3}$ | $0.13208 \times 10^{-4}$ | $-0.14593 \times 10^{-5}$ |
| 12 | −1.00 | $-0.15810 \times 10^{-3}$ | $0.38927 \times 10^{-4}$ | $-0.11704 \times 10^{-5}$ |
| 13 | −1.00 | $0.32188 \times 10^{-4}$ | $0.11336 \times 10^{-4}$ | $0.67536 \times 10^{-6}$ |

| Surf. No. | A10 |
|---|---|
| 4 | $-0.23075 \times 10^{-9}$ |
| 12 | $0.84406 \times 10^{-8}$ |
| 13 | $-0.33338 \times 10^{-7}$ |

The symbol * designates the aspherical surface which is rotationally symmetrical with respect to the optical axis.

TABLE 8

Data of Each Lens Group (when an object at infinity is photographed)

Magnification of Each Lens Group

| Lens-Group No. | W | M1 | M2 | M3 | T |
|---|---|---|---|---|---|
| 1 | 0.000 | 0.000 | 0.000 | 0.000 | 0.000 |
| 2 | −0.497 | −0.662 | −0.884 | −1.195 | −1.764 |
| 3 | 0.734 | 0.712 | 0.741 | 0.771 | 0.798 |

Focusing sensitivity of each lens group

| Lens-Group No. | K3(W) | K3(M1) | K3(M2) | K3(M3) | K3(T) |
|---|---|---|---|---|---|
| 1 | 0.133 | 0.222 | 0.429 | 0.849 | 1.982 |
| 2 | 0.406 | 0.285 | 0.120 | −0.254 | −1.345 |
| 3 | 0.461 | 0.493 | 0.451 | 0.406 | 0.363 |

The amount of focal point shift (a shift from the designed position of the imaging plane) occurring at W, M1, M2, M3 and T due to manufacturing error:

$\Delta FB(W) = 0.050$
$\Delta FB(M1) = 0.061$
$\Delta FB(M2) = 0.088$
$\Delta FB(M3) = 0.133$
$\Delta FB(T) = 0.233$
The amount of adjustment of the imaging device 15 (the first adjustment):

$\Delta X2 = 0.05$
The amount of focal point shift remaining after the first adjustment:

$\Delta FB(W) - \Delta X2 = 0.000$
$\Delta FB(M1) - \Delta X2 = 0.011$
$\Delta FB(M2) - \Delta X2 = 0.038$
$\Delta FB(M3) - \Delta X2 = 0.083$
$\Delta FB(T) - \Delta X2 = 0.183$
The amount of focus adjustment by the focusing lens group at W, M1, M2, M3 and T (the second adjustment):

$\Delta X1(W) = -(\Delta FB(W) - \Delta X2)/K3(W) = 0.000$
$\Delta X1(M1) = -(\Delta FB(M1) - \Delta X2)/K3(M1) = -0.022$
$\Delta X1(M2) = -(\Delta FB(M2) - \Delta X2)/K3(M2) = -0.084$
$\Delta X1(M3) = -(\Delta FB(M3) - \Delta X2)/K3(M3) = -0.205$
$\Delta X1(T) = -(\Delta FB(T) - \Delta X2)/K3(T) = -0.504$ Embodiment 5

Table 9 shows the numerical data of the zoom lens system (having three lens groups) of a fifth embodiment, according to the focus adjustment method of the present invention.

Table 9 shows zoom data of each lens group when an object at infinity is photographed; and data of the amount of focus adjustment.

The diaphragm S is provided 0.60 in front (on the object side) of the second lens group 20 (surface No. 7). The definition of the amount of focal point shift, the amount of focus adjustment and that of the focusing sensitivity (K3(W), K3(M1), K3(M2), K3(M3) and K3(T)) are the same as those of the first embodiment.

TABLE 9

FNO. = 1:2.6-3.0-3.7-4.6-5.9
f = 5.0(W)-6.6(M1)-9.8(M2)-13.7(M3)-19.3(T)
A = 41.3-33.3-22.8-16.5-12.0
fB = 0.59-0.59-0.59-0.59-0.59

| Surf. No. | r | d | Nd | ν |
|---|---|---|---|---|
| 1 | 49.757 | 0.70 | 1.77250 | 49.6 |
| 2 | 7.334 | 3.31 | | |
| 3* | 342.560 | 0.80 | 1.54358 | 55.7 |
| 4* | 24.928 | 0.10 | | |
| 5 | 19.159 | 1.40 | 1.92286 | 18.9 |
| 6 | 57.522 | 17.11-12.05-7.31-4.14-2.05 | | |
| 7* | 6.314 | 2.10 | 1.48749 | 70.2 |
| 8* | −15.433 | 0.10 | | |
| 9 | 5.920 | 1.80 | 1.77250 | 49.6 |
| 10 | −13.346 | 0.90 | 1.80610 | 33.3 |
| 11 | 3.502 | 4.08-5.86-9.91-14.08-20.07 | | |
| 12* | 30.458 | 2.00 | 1.54358 | 55.7 |
| 13* | −12.239 | 2.49-2.49-1.98-1.94-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf.No. | K | A4 | A6 | A8 |
|---|---|---|---|---|
| 3 | −1.00 | $-0.12328 \times 10^{-2}$ | $0.49196 \times 10^{-4}$ | $-0.61129 \times 10^{-6}$ |
| 4 | −1.00 | $-0.13424 \times 10^{-2}$ | $0.51891 \times 10^{-4}$ | $-0.78426 \times 10^{-6}$ |
| 7 | −1.00 | $0.13758 \times 10^{-5}$ | $0.12745 \times 10^{-4}$ | $-0.97795 \times 10^{-6}$ |
| 8 | −1.00 | $0.13378 \times 10^{-3}$ | $0.16080 \times 10^{-4}$ | $-0.13847 \times 10^{-5}$ |
| 12 | −1.00 | $-0.31294 \times 10^{-4}$ | $0.43480 \times 10^{-4}$ | $-0.87106 \times 10^{-6}$ |
| 13 | −1.00 | $0.22250 \times 10^{-3}$ | $0.32313 \times 10^{-4}$ | $-0.15637 \times 10^{-6}$ |

| Surf.No. | A10 |
|---|---|
| 4 | $0.11619 \times 10^{-8}$ |
| 12 | $0.22679 \times 10^{-7}$ |
| 13 | $0.11000 \times 10^{-7}$ |

The symbol * designates the aspherical surface which is rotationally symmetrical with respect to the optical axis.

TABLE 10

Data of Each Lens Group
(when an object at infinity is photographed)

Magnification of Each Lens Group

| Lens-Group No. | W | M1 | M2 | M3 | T |
|---|---|---|---|---|---|
| 1 | 0.000 | 0.000 | 0.000 | 0.000 | 0.000 |
| 2 | −0.514 | −0.678 | −0.964 | −1.343 | −1.812 |
| 3 | 0.716 | 0.717 | 0.748 | 0.751 | 0.783 |

Focusing sensitivity of each lens group

| Lens-Group No. | K3(W) | K3(M1) | K3(M2) | K3(M3) | K3(T) |
|---|---|---|---|---|---|
| 1 | 0.135 | 0.236 | 0.520 | 1.017 | 2.013 |
| 2 | 0.377 | 0.278 | 0.040 | −0.453 | −1.400 |
| 3 | 0.487 | 0.486 | 0.440 | 0.436 | 0.387 |

TABLE 10-continued

The amount of focal point shift (a shift from the designed position of the imaging plane) occurring at W, M1, M2, M3 and T due to manufacturing error:

$\Delta FB(W) = -0.054$
$\Delta FB(M1) = -0.069$
$\Delta FB(M2) = -0.108$
$\Delta FB(M3) = -0.160$
$\Delta FB(T) = -0.260$ The amount of adjustment of the imaging device 15 (the first adjustment):

$\Delta X2 = -0.260$

The amount of focal point shift remaining after the first adjustment:

$\Delta FB(W) - \Delta X2 = 0.206$
$\Delta FB(M1) - \Delta X2 = 0.191$
$\Delta FB(M2) - \Delta X2 = 0.152$
$\Delta FB(M3) - \Delta X2 = 0.100$
$\Delta FB(T) - \Delta X2 = 0.000$ The amount of focus adjustment by the focusing lens group at W, M1, M2, M3 and T (the second adjustment):

$\Delta X1(W) = -(\Delta FB(W) - \Delta X2)/K3(W) = -0.423$
$\Delta X1(M1) = -(\Delta FB(M1) - \Delta X2)/K3(M1) = -0.393$
$\Delta X1(M2) = -(\Delta FB(M2) - \Delta X2)/K3(M2) = -0.345$
$\Delta X1(M3) = -(\Delta FB(M3) - \Delta X2)/K3(M3) = -0.229$
$\Delta X1(T) = -(\Delta FB(T) - \Delta X2)/K3(T) = 0.000$ Table 11 shows the numerical values of each embodiment with respect to conditions (2) and (3).

TABLE 11

| | Embod. 1 | Embod. 2 | Embod. 3 | Embod. 4 | Embod. 5 |
|---|---|---|---|---|---|
| Cond. (2) | 0.06 | 0.08 | 0.09 | 0.01 | 0.05 |
| Cond. (3) | 0.02 | 0.04 | 0.04 | 0.10 | 0.08 |

As can be understood from Table 11, the first through fifth embodiments satisfy conditions (2) and (3). In regard to condition (1), each embodiment satisfies $|\Delta FB(W)| \leq |\Delta X2| \leq |\Delta FB(T)|$.

According to the present invention, a focus adjustment method of a zoom lens system which can easily carry out a focus adjustment without enlarging the zoom lens system can be attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focus adjustment method of a zoom lens system for correcting a focal point shift caused by manufacturing error, wherein said zoom lens system comprises three movable lens groups in which at least two of said movable lens groups are moved in an optical axis direction to perform zooming to form an image onto an imaging device;
   wherein in said zoom lens system, a finite number of focal length positions at which a focus adjustment is performed is provided;
   wherein said movable lens group which is closest to said imaging device out of said three movable lens groups comprises a focusing lens group;
   wherein a position of said focusing lens group in the optical axis direction is controlled via pulses of a stepping motor;
   wherein said focus adjustment method of a zoom lens system comprises the combination of performing said control of said focusing lens group to determine a position of said focusing lens group in the optical axis direction via pulses of said stepping motor and determining an amount of adjustment of said imaging device in the optical axis direction;

wherein said performing said control of said focusing lens group and said determining an adjustment amount of said imaging device comprises:

a first adjustment in which an amount of adjustment of said imaging device in the optical axis direction is determined based on a traveling distance of said focusing lens group from a standard position to an in-focus position thereof, respectively at the long focal length extremity and the short focal length extremity; and a second adjustment in which said focusing lens group is moved, at at least three distinct focal length positions including the short focal length extremity and the long focal length extremity, to an in-focus position with respect to said imaging device having been adjusted via said first adjustment; at each of the focal length positions, a amount of focus adjustment of said focusing lens group is determined; and said amount of focus adjustment is stored in a memory as a pulse number of said stepping motor.

2. The focus adjustment method of a zoom lens system according to claim 1, satisfying the following conditions:

$$|\Delta FB(W)| \leq |\Delta X2| \leq |\Delta FB(T)|$$

$$|\Delta X2|/fw \leq 0.1$$

wherein $\Delta FB(W)$ designates the amount of focal point shift at the short focal length extremity;

$\Delta FB(T)$ designates the amount of focal point shift at the long focal length extremity;

$\Delta X2$ designates an amount of adjustment of said imaging device in the optical axis direction; and fw designates the focal length of said entire zoom lens system at the short focal length extremity.

3. The focus adjustment method of a zoom lens system according to claim 2, wherein said amount of adjustment of said imaging device is determined so that said amount of focus adjustment of said focusing lens group at the short focal length extremity has an opposite sign to that of said amount of focus adjustment of said focusing lens group at the long focal length extremity.

4. The focus adjustment method of a zoom lens system according to claim 1, satisfying the following condition:

$$|\Delta X1(W)+\Delta X1(T)|/fw<0.15$$

wherein $\Delta X1(W)$ designates a amount of focus adjustment of said focusing lens group at the short focal length extremity;

$\Delta X1(T)$ designates a amount of focus adjustment of said focusing lens group at the long focal length extremity; and fw designates the focal length of said entire zoom lens system at the short focal length extremity.

5. The focus adjustment method of a zoom lens system according to claim 1, wherein said three movable lens groups comprise a negative first lens group, a positive second lens group, a positive third lens group, and said imaging device with a filter group, in this order from an object, wherein said positive third lens group comprise said focusing lens group.

6. An electronic imaging apparatus comprising a zoom lens system that is adjusted according to the focus adjustment method of a zoom lens system of claim 1.

\* \* \* \* \*